Feb. 12, 1963 A. F. VIEHWEGER, JR 3,077,120
POWER ADAPTER FOR LANDING GEAR OF SEMI-TRAILERS
Filed Nov. 18, 1960 3 Sheets-Sheet 1

INVENTOR
A. F. Viehweger, Jr.

BY Mawhinney & Mawhinney
ATTORNEYS

Feb. 12, 1963  A. F. VIEHWEGER, JR  3,077,120
POWER ADAPTER FOR LANDING GEAR OF SEMI-TRAILERS
Filed Nov. 18, 1960  3 Sheets-Sheet 2

INVENTOR
A. F. Viehweger, Jr.

BY Mawhinney & Mawhinney
ATTORNEYS

Feb. 12, 1963   A. F. VIEHWEGER, JR   3,077,120
POWER ADAPTER FOR LANDING GEAR OF SEMI-TRAILERS
Filed Nov. 18, 1960   3 Sheets-Sheet 3

INVENTOR
A. F. Viehweger, Jr.

BY Mawhinney & Mawhinney
ATTORNEY

United States Patent Office 3,077,120
Patented Feb. 12, 1963

3,077,120
POWER ADAPTER FOR LANDING GEAR OF SEMI-TRAILERS
August F. Viehweger, Jr., P.O. Box 315, Plymouth, Fla.
Filed Nov. 18, 1960, Ser. No. 70,202
4 Claims. (Cl. 74—354)

The present invention relates to power adapter for landing gear of semi-trailers, and more particularly refers to a mechanical operating mechanism for landing gears of truck trailers applicable to existing conventional hand-operated jacking devices for landing gear, whereby the replacement may be made economically and permit of air valve or electrical switch control from the nose or other convenient location on the trailer.

The invention has for a further object to provide a power unit adaptable to connection with the drive shaft of the landing gear and for convenient support on the trailer at the location of the drive shaft, such unit being self-contained, compact and completely reliable in operation.

With the foregoing and other objects in view, the invention will be more fully described hereinafter, and will be more particularly pointed out in the claims appended hereto.

In the drawings, wherein like symbols refer to like or corresponding parts throughout the several views.

Figure 1:
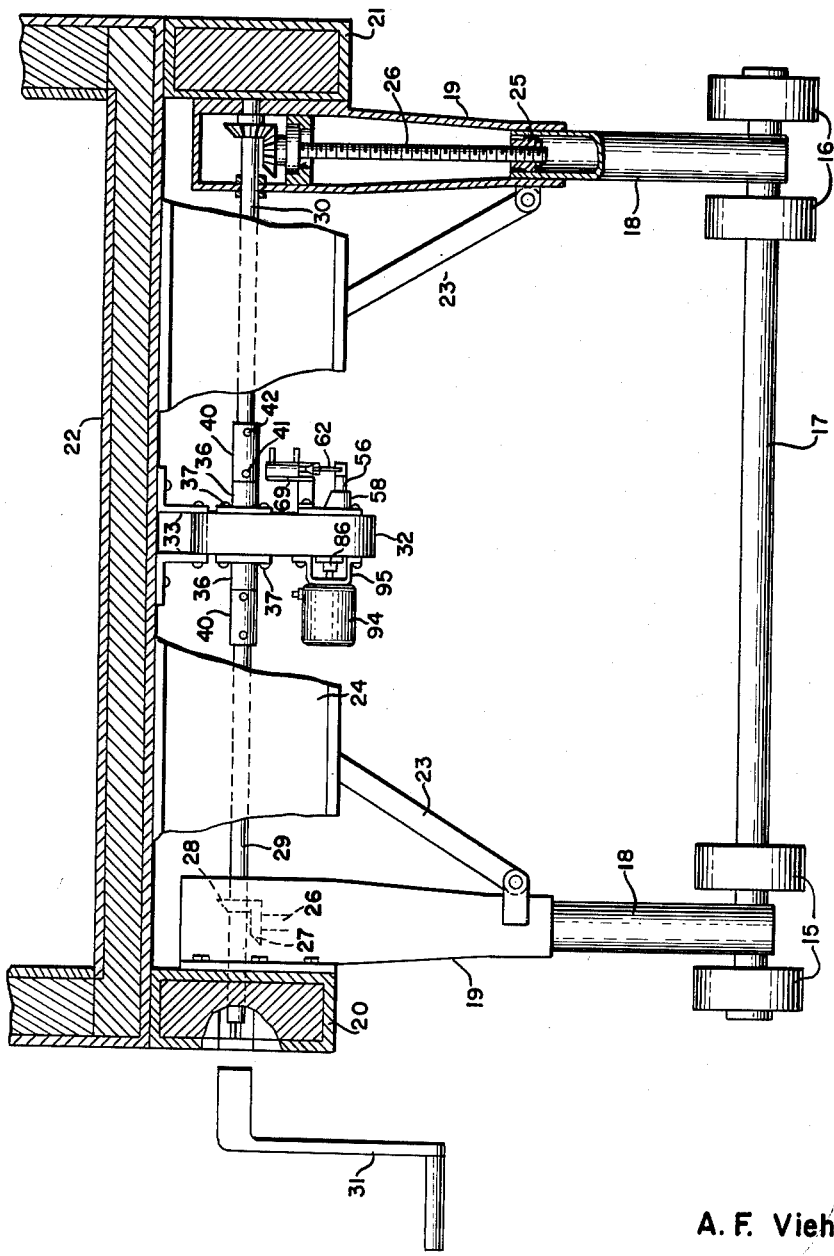
FIGURE 1 is a fragmentary vertical sectional view taken through a portion of a truck trailer with parts broken away and illustrating a conventional form of landing gear with the novel power adapter of this invention illustrated in elevation and coupled to sections of the drive shaft for the landing gear.
Figure 8:
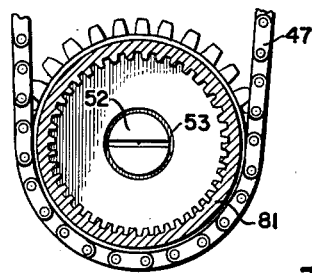
FIGURE 8 is a vertical transverse section taken on the line 8—8 in FIGURE 2.

Referring more particularly to the drawings, 15 and 16 designate pairs of landing gear wheels mounted upon a common shaft 17, which shaft is journaled in the lower end portions of two spaced lower non-rotatable telescopic legs 18 slidable vertically in upper non-rotatable tubular legs 19 fixed to longitudinal rails 20, 21 depending from the trailer body 22.

Braces 23 may be connected to the upper fixed legs 19 and to a transverse beam 24 also of the trailer body.

Nuts 25 are affixed to upper end portions within the telescopic legs 18 and are engaged by threaded spindles 26 having fast on their upper ends beveled pinions 27 disposed in mesh with right angularly related beveled pinions 28 on drive shaft end sections 29 and 30.

In FIGURE 1 a hand crank 31 is shown as connectible to an exposed end of the drive shaft section 29, this being the present method for operating the landing gear by rotating the drive shaft to rotate the pinions 28, 27, the threaded spindles 26, thus causing the nuts 25 to run up and down on these spindles carrying the telescopic legs 18 therewith and incidentally raising or lowering the shaft 17 with the landing wheels 15, 16.

The above-described construction is conventional, being illustrated in Patent No. 2,817,493, granted December 24, 1957, except that pursuant to the present invention the drive shaft is split, that is, centrally divided whereby to receive the power adapter of this invention which is shown in FIGURE 1 as being contained substantially within a housing 32 supported by hanger brackets 33 from the bed of the trailer 22.

Figure 2:
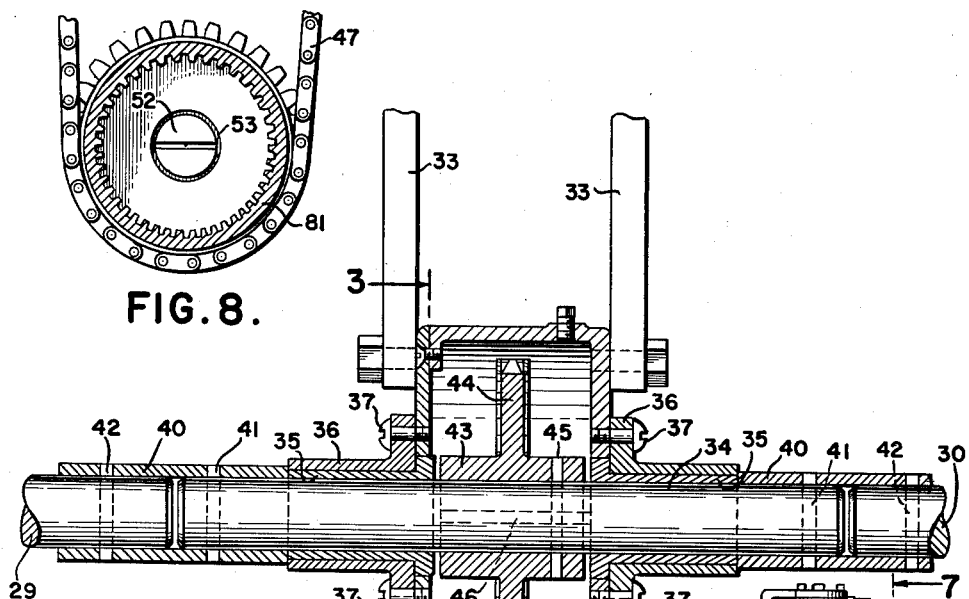
FIGURE 2 is a vertical sectional view taken on a much magnified scale of the power adapter and illustrating its connections to the sections of the drive shaft for the landing gear.
Figure 9:
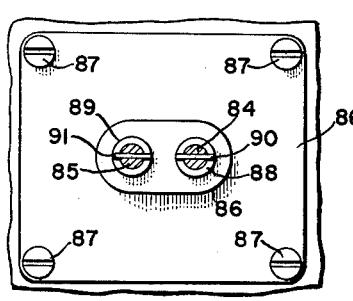
FIGURE 9 is a similar view taken on the line 9—9 also in FIGURE 2.

As shown more particularly in FIGURE 2, this housing 32 receives therethrough a central section 34 of the drive shaft which is journaled in bushings 35 encased in flanged tubular bearings 36 affixed, as by screws 37, to the cover 38 of the housing 32 and base wall 39 of such housing 32, respectively.

The ends of the central drive section 34 extend beyond the bearings 36 and into coupling sleeves 40 to which they are affixed, as by pins 41.

The adjacent ends of the drive shaft end sections 29, 30 are fitted into the outer ends of the coupling sleeves 40 and are secured as by pins 42 to such coupling sleeves.

The hub 43 of a driven sprocket 44 is secured, as by a pin 45 and a spline 46, to the central part of such central section 34 of the drive shaft within the housing 32. A chain 47 is trained about the driven sprocket 44 at its upper portion and at its lower portion receives a drive sprocket 48 having a hub 49 fitted over a bushing 50 surrounding the shank of a screw stud 51 having a head 52 occupying a recess 53 in the hub 49. The threaded end of the stud 51 opposite the head 52 is threaded into a threaded opening 54 of a rocker arm 55. Such rocker arm is affixed to the inner end of a rock shaft 56 journaled in a bushing 57 in a bearing member 58 mounted outside the housing 32 and affixed, as by screws 59 and 59a, to the base wall 39 of the housing 32, a gasket 60 being preferably interposed between the bearing member 58 and the base housing wall 39. A cross pin 61 through the rock shaft 56 just beyond the end of the bearing 58 holds the rock shaft 56 against any substantial axial shifting movement.

Figure 7:
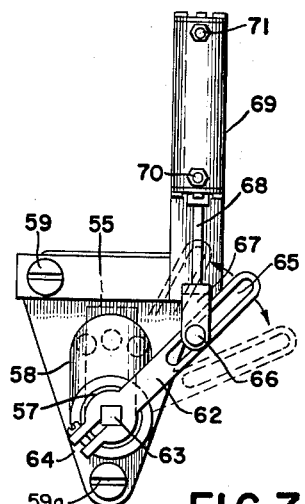
FIGURE 7 is an end elevation view of a form of pneumatic motor for controlling the shifting of the ring gear to the positions of FIGURES 3, 4 and 5.

As shown more particularly in FIGURES 2 and 7, a slotted arm 62 is removably or otherwise fitted to the square outer end 63 of the rock shaft 56, being secured thereto as by clamp 64. The slot 65 of the arm 62 slidingly receives therein a pin 66 carried by the bifurcated end 67 of a plunger rod 68 which is driven by a motor 69 which may be an air or hydraulic motor, or a solenoid motor. Fluid or electric wire connections 70, 71 may be made to the motor 69 and lead to a control device 72 which may be a fluid valve, or control switch preferably installed at the nose of the tractor where it may be conveniently operated by the driver of the vehicle.

A supporting bracket 73 may be used to support the motor 69 from the housing base 39 and if desired the screws or other fastenings 59 may also serve to bind this bracket 73 in place.

Referring more particularly to FIGURE 2, a set screw 74 in the rocker arm 55 may be used to bind the screw stud 51 in place and against casual rotation. The outer end of the stud 51 is bored to provide a recess opening through the outer end of the stud for receiving therein a coil spring 76 and a ball detent 77, which latter is yieldingly projected by the coil spring 76 against the inner face of the bearing member 58 in which are disposed in spaced and arcuate relation (FIGURE 6) a neutral central socket 78 and lateral drive and reverse sockets 79, 80 corresponding to angular positions of the rocker arm 55 illustrated in FIGURE 3, 4 and 5.

Figure 3:
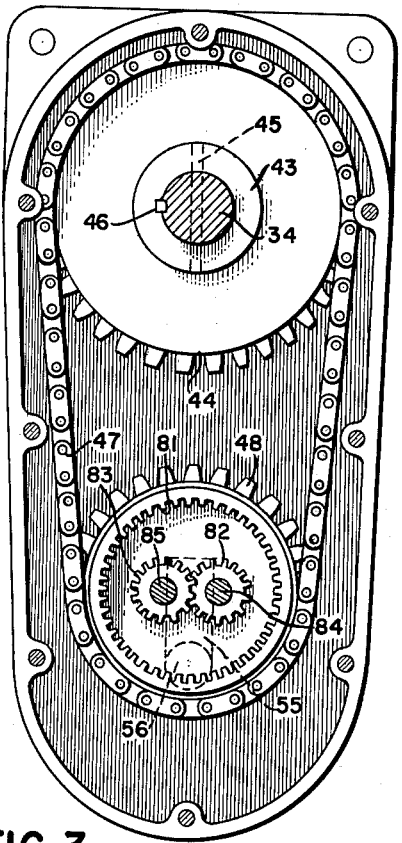
FIGURE 3 is a vertical transverse sectional view taken on the line 3—3 of FIGURE 2 and illustrating the mechanism in a neutral position.
Figure 4:
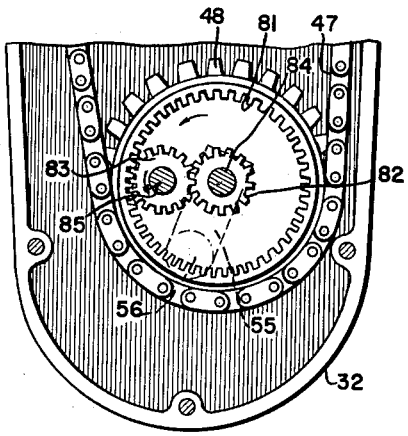
FIGURE 4 is a fragmentary view like FIGURE 3 showing the ring gear shifted to one side of the casing for engagement with the idler pinion for drive of the mechanism in one direction.
Figure 5:
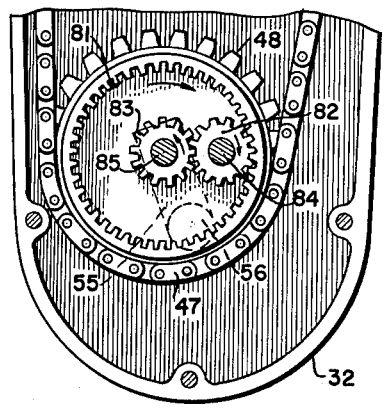
FIGURE 5 is a view similar to FIGURE 4 showing the ring gear at the opposite side of the casing and in mesh with the drive pinion.
Figure 6:
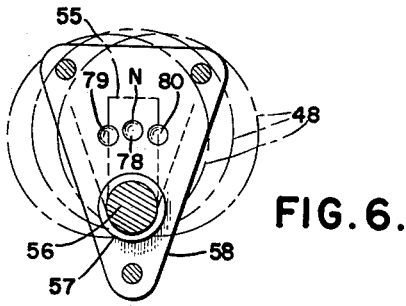
FIGURE 6 is a vertical cross section taken on the line 6—6 of FIGURE 2.

Connected to rotate fixedly with the drive sprocket 48, as by integral casting or affixation, is an internal ring gear 81 having an internal space to include therein a pair of pinions 82, 83, one or both of which may be driven. For instance, as shown the pinion 82 is a drive pinion mounted upon a drive pinion shaft 84 while the pinion 83 is an idler mounted upon an idler pinion shaft 85. The pinions are meshed together as shown in FIGURES 3, 4 and 5 whereby the drive pinion 82 drives the idler 83 but in a relatively reverse rotary direction.

A bearing member 86 affixed to the outside of the housing cover 38 as by bolts 87 contains bushings 88, 89 for receiving the shafts 84, 85. Confining pins 90, 91 through the shafts 84, 85 just beyond the bearing member 86 serve to prevent substantial axial sliding movement of the shafts 84, 85.

In FIGURE 2, 92 designates a motor shaft coupled by a detachable coupling 93 to the drive pinion shaft 84, and 94 represents a motor which may be a pneumatic or hydraulic motor or an electric motor. The motor 94 may be carried in brackets 95 affixed to the housing cover 38.

In installation, the conventional drive shaft has a central section removed therefrom to admit the installation of the power adapter of this invention. The coupling sleeves may be slid over the inner end portions of the outer sections 29, 30 which remain of the conventional drive shaft. Then after the power adapter unit is inserted into place and fastened to the brackets 33 with the central drive shaft section 34 in axial alinement with the end drive shaft sections 29, 30, the coupling sleeves 40 are moved up against the tubular bearings 36, and the pins 41 and 42 inserted through the adjacent end portions of the central shaft section 34 and the end sections 29, 30 whereby the driven sprocket 44 will drive the central shaft section 34 and through the coupling sleeves 40 and pins 41, 42 will communicate like motion to the end shaft sections 29, 30 upon which are affixed the beveled gear wheels 28. The rotational movement of the drive shaft will therefore be communicated to the lifting and lowering mechanism of the landing gear installed in the leg sections 18 and 19.

The driven sprocket 44 is driven through the chain 47 from the lower drive sprocket 48. This drive is derived primarily from the motor 94 which, through the shafts 92 and 84, rotates the drive pinion 82 in a direction which for convenience of illustration is marked by the arrows in FIGURES 3, 4 and 5 as clockwise rotation. Accordingly, the rotational movement of the companion pinion 83 will be counterclockwise. The pinion couple 82, 83 is held in fixed position within the ring gear 81 and the combined diameters of the pinions are less than the diameter of the ring gear 81, as shown in FIGURE 3, in order that in the intermediate neutral position of the ring gear 81, as illustrated in FGURE 3, the teeth of such ring gear will be spaced from both pinions whereby the rotation of the pinions will be ineffective to communicate any rotation to the ring gear 81 and its sprocket 48. However, through movement of the rocker arm 55 to either the position of FIGURE 4 or 5 the teeth of the ring gear 81 may be moved into mesh selectively with one or other of the pinions.

Pursuant to FIGURE 4 where the ring gear 81 is in mesh with the idler pinion 83, such gear 81 and its sprocket 48 will be driven in an anticlockwise rotation.

Pursuant to FIGURE 5 where the ring gear has been rocked or moved by the rocker arm 55 to the opposite side of the housing 32, the teeth of the ring gear 81 will then mesh only and solely with the teeth of the pinion 82 which will cause the ring gear 81 and its sprocket 48 to rotate clockwise as indicated by the arrow in this FIGURE 5.

When in any one of the three positions indicated in FIGURES 3, 4 and 5, the ball detent 77 will occupy the appropriate depression or socket 78, 80 or 79 and under the influence of the coil spring 77 will hold the rocker arm 55 in the indicated position until forcibly removed therefrom by the action of the motor 69 in rotating the rock shaft 56 and the rocker arm 55.

When the ring gear 81 is in the position of FIGURE 4 it will drive the landing gear in one direction, and when in the position of FIGURE 5 in the opposite direction whereby the landing gear may be lifted and lowered vary quickly without effort on the part of the operator and will be held locked in the position to which driven without incurring further operational motions.

The control device 72, be it valve or electric switch, may be swung by the operator to one or the other side in a simple action which will thereupon elevate or lower the landing gear as required.

If it is desired to separate the pinions 82, 83, the shafts of each may be coupled to separate drive motors rotated in relatively opposite direction. Whether or not the pinions 82, 83 are separately rotated, their effect on the ring gear 81 is that of dual drive members rotating in relatively opposite directions and driving the ring gear 81 and its sprocket 48 in selected clockwise or anticlockwise directions of rotation. In this sense the ring gear 81, its sprocket 48 and hub 49, as a unit, constitute a follower member having both rotary motion about the horizontal axis of the stud 51 and motion of translation or bodily movement of the unit incident to the angular movements of the rocker arm 55 to which the unit is attached eccentric to the axis of the shaft 56 about which the arm 55 rocks. Owing to this movement of translation it may be desired to have a flexible transmission element, here in the form of the chain 47, by which the rotation of the unit is conveyed to driven mechanism.

It will be appreciated that the device of the invention employs power already supplied by the tractor, namely, air pressure or electro-motive force without the necessity of adding heavy batteries or other added weight which might conflict with weight loss.

With the use of the present device, landing gears of pipe or drive shaft type, now in use, do not have to be discarded, which is expensive, but can be converted to power type by the use of the present drive device which is small in size, which factor keeps weight to a minimum. The fact that the device is small in size and also on account of its specific simplicity makes for easy servicing and general upkeep of the unit.

It will be noted that the device is simple to install with standard small air diaphragms, standard electric solenoids, and standard air and electric motors of small size.

The device is light in construction and weight and fits all trailers with screw jack landing gears.

The device is not incorporated in, or attached to, landing gear, gear box or jack screw, but is an independent drive coupled to each screw jack by drive shaft sections.

It will be understood of course that mechanical equivalents of the parts and combination of parts herein illustrated are within the contemplation of the invention, for instance V or other belts may replace the chain 47 and pulleys replace the sprockets 44, 48.

Although I have disclosed herein the best form of the invention known to me at this time, I reserve the right to all such modifications and changes as may come within the scope of the following claims.

What I claim is:

1. In a power adapter,
   (a) a casing,
   (b) an upper sprocket journaled in an upper portion of the casing for rotation in a substantially vertical plane,
   (c) a lower sprocket in the lower portion of the casing in substantially vertical alinement with the upper sprocket,
(d) a stud having a substantially horizontal axis on which the lower sprocket rotates,
(e) a control shaft also having a substantially horizontal axis but spaced below the axis of the stud,
(f) a rocker arm affixed at its lower portion to the control shaft, upstanding from the control shaft and carrying the stud at its upper portion,
(g) a flexible chain connecting the sprockets and in the lower portion of which the lower sprocket is adapted to bodily swing in an arc having the axis of the control shaft as its center of motion,
(h) a drive pinion,
(i) an idler pinion,
(j) means to rotate said pinions in opposite directions,
(k) said lower sprocket having an internal ring of gear teeth adapted to be brought selectively into mesh with the teeth of the drive and idler pinions upon movement of said lower sprocket in its arc of movement, and
(l) means to impart movement to the control shaft to actuate said rocker arm so that said lower sprocket is swung in its arc of movement.

2. In a power adapter as claimed in claim 1, wherein
(m) a fixed member is provided for said control shaft, and
(n) said stud carries a spring pressed ball for frictionally engaging said fixed member to retain the lower sprocket and its internal ring of teeth in their selected positions.

3. In a power adapter as claimed in claim 2, wherein
(o) said lower sprocket and its internal ring of teeth are adapted to be brought selectively, upon said bodily movement in said arc, to a first position in which the ring of teeth mesh with the idler pinion, a second position in which the ring of teeth mesh with the drive pinion and a third neutral position in which the ring of teeth do not mesh with either the idler pinion or the drive pinion,
(p) said fixed member has three sockets for selectively receiving said spring pressed ball to retain the lower sprocket and its internal ring of teeth selectively in their three positions.

4. In a power adapter as claimed in claim 2, wherein
(q) said lower sprocket comprises a hub rotatably carried by said stud and directly carrying the internal ring of teeth at one side thereof.

References Cited in the file of this patent
UNITED STATES PATENTS

| | | |
|---|---|---|
| 644,211 | McGee | Feb. 27, 1900 |
| 1,200,620 | Johnson | Oct. 16, 1916 |
| 2,431,149 | Sylvander | Nov. 18, 1947 |
| 2,959,395 | Strack et al. | Nov. 8, 1960 |